US009577849B2

(12) United States Patent
Sarperi et al.

(10) Patent No.: US 9,577,849 B2
(45) Date of Patent: Feb. 21, 2017

(54) MIMO WIRELESS COMMUNICATION SYSTEMS

(75) Inventors: Luciano Pietro Giacomo Sarperi, Bern (CH); Rajaguru Mudiyanselage Mythri Hunukumbure, Hillingdon (GB)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 13/464,348

(22) Filed: May 4, 2012

(65) Prior Publication Data

US 2012/0219082 A1   Aug. 30, 2012

Related U.S. Application Data

(63) Continuation of application No. PCT/GB2009/002684, filed on Nov. 16, 2009.

(51) Int. Cl.
*H04B 7/02* (2006.01)
*H05B 6/74* (2006.01)
(Continued)

(52) U.S. Cl.
CPC .......... *H04L 25/03203* (2013.01); *H01Q 1/08* (2013.01); *H04L 5/0023* (2013.01);
(Continued)

(58) Field of Classification Search
CPC ................ H04L 2025/03426; H04L 1/0054; H04L 1/006; H04L 25/0204; H04L 1/0059; H04L 25/14; H04L 2025/03414; H04L 2025/0342; H04L 2025/03802; H04L 25/03891; H04L 1/0631
(Continued)

(56) References Cited

U.S. PATENT DOCUMENTS 2,979,608 A * 4/1961 Sirons ...................... H01Q 1/08
343/720
4,568,811 A * 2/1986 Yoshimura ........... H05B 6/6402
219/745
(Continued)

FOREIGN PATENT DOCUMENTS

GB          2453772          4/2009

OTHER PUBLICATIONS

Sungsoo Kim et al.;"Capacity and Performance of Lattice Reduction Aided Linear Processing with Lattice Encoding and Decoding in Limited Feedback Systems"; IEEE Journal on Selected Areas in Communications; vol. 26; No. 8; Oct. 2008. [Ref.: ISR mailed Nov. 5, 2010].
(Continued)

*Primary Examiner* — Daniel Washburn
*Assistant Examiner* — Sarah Hassan
(74) *Attorney, Agent, or Firm* — Myers Wolin, LLC (57) ABSTRACT

A wireless communication system is described which includes a transmitter operable to transmit a transmitted signal, the transmitter having one or more transmitting antennae, a receiver operable to receive a received signal, the receiver having one or more receiving antennae, wherein lattice reduction is used in obtaining, at the receiver, an estimate of the transmitted signal based on the received signal, characterized in that the lattice reduction utilizes a lattice reduction matrix, a decomposed representation of which is transmitted between the transmitter and the receiver.

16 Claims, 6 Drawing Sheets

(51) Int. Cl.
*H04L 25/03* (2006.01)
*H01Q 1/08* (2006.01)
*H04L 5/00* (2006.01)
*H04L 25/02* (2006.01)

(52) U.S. Cl.
CPC ........ *H04L 5/0091* (2013.01); *H04L 25/0204* (2013.01); *H04L 25/0242* (2013.01); *H04L 25/03292* (2013.01)

(58) Field of Classification Search
USPC .......................................... 375/267; 219/745
See application file for complete search history.

(56) References Cited

U.S. PATENT DOCUMENTS

| | | | | |
|---|---|---|---|---|
| 5,335,368 | A * | 8/1994 | Tamura | H01Q 1/244 343/702 |
| 2005/0281188 | A1* | 12/2005 | Cho | H04B 1/7136 370/208 |
| 2006/0170571 | A1* | 8/2006 | Martinian et al. | 341/50 |
| 2006/0198459 | A1* | 9/2006 | Fischer | H04L 1/0618 375/267 |
| 2007/0121753 | A1* | 5/2007 | McNamara | H04L 1/0631 375/267 |
| 2008/0013444 | A1* | 1/2008 | Sandell | H04L 1/0631 370/203 |
| 2008/0181335 | A1* | 7/2008 | Ponnampalam et al. | 375/319 |
| 2009/0003476 | A1* | 1/2009 | Rog | H04L 25/0204 375/260 |
| 2009/0185631 | A1* | 7/2009 | Choi et al. | 375/260 |
| 2012/0183088 | A1* | 7/2012 | Liao | H04L 25/0246 375/267 |

OTHER PUBLICATIONS

Huan Yo et al.; "Lattice-Reduction-Aided Detectors for MIMO Communication Systems"; Dept. EECS and Research Laboratory of Electronics; MIT; Cambridge, MA 02139, USA.

Tien Due Nguyen et al.;"Quantization Error Correction Scheme for Lattice-Reduction Aided Linear Detection in MIMO System";Third IEEE International Conference on Wireless and Mobile Computing; Networking and Communications (WiMob 2007). [Ref.: ISR mailed Nov. 5, 2010].

Mohammad Erfan Danesh Jafari et al.; "Adaptive Lattice Reduction in MIMO Systems"; Department of Electrical and Computer Eng.; ON, Canada, N2L 3G1.

Hyun Jong Yang et al.;"LR-Aided Precoding with a Modified LLL Algorithm for Limited Feedback MIMO Systems"; Korea Advanced Institute of Science and Technology; Daejon, Republic of Korea; Asilomar 2008.[Ref.: ISR mailed Nov. 5, 2010].

Quentin H. Spencer et al.;"Zero-Forcing Methods for Downlink Spatial Multiplexing in Multiuser MIMO Channels"; Student Member; IEEE Transactions on Signal Processing; vol. 52; No. 2; Feb. 2004.

Mark Elo, Keithley Instruments; "A rough guide to MIMO"; ElectronicsWeekly.com., pp. 1-3; Dated Monday Mar. 31, 2008.

International Search Report issued for corresponding International Patent Application No. PCT/GB2009/002684, mailed Nov. 5, 2010.

Office Action issued for corresponding Chinese Patent Application No. 200980162102.0, dated May 29, 2014, with an English translation.

* cited by examiner

MIMO WIRELESS COMMUNICATION SYSTEMS

CROSS-REFERENCE TO RELATED APPLICATION

This application is a continuation application of International Application PCT/GB2009/002684 filed Nov. 16, 2009 which designated the United States and published on May 19, 2011.

TECHNICAL FIELD

The present invention relates to wireless communication systems, and particularly wireless communication systems having so-called multiple-input multiple-output (MIMO) capability, for example but not exclusively those compliant with the 3GPP LTE, 3GPP LTE-A, IEEE 802.16 and 802.11 groups of standards.

BACKGROUND

Wireless communication systems are widely known in which a base station (BS) communicates with multiple subscriber stations (SSs) or mobile stations (MSs) within range of the BS. The terms subscriber station (SS) and mobile station (MS) may be considered interchangeable for the purposes of this specification, and both SSs and MSs may be referred to generically as users or user stations. Also, whilst the terms subscriber station (SS) and mobile station (MS) may be used interchangeably, the term "mobile" in particular should not be construed to necessarily imply that the user station (etc) must always be movable. In many cases it will be movable (e.g. a mobile handset). However, wireless communication systems (and the present invention) can also operate where the SS/user/user station is fixed in position at a particular location.

The area covered by one BS is called a cell and typically, many base stations (BSs) are provided in appropriate locations so as to cover a wide geographical area more or less seamlessly with adjacent cells. Each BS divides its available bandwidth, i.e. frequency and time resources, into individual resource allocations for the users. There is a constant need to increase the capacity of such systems in order to accommodate more users and/or more data-intensive services.

OFDM (Orthogonal Frequency Division Multiplexing) is one known technique for transmitting data in a wireless communication system. An OFDM-based communications scheme divides data symbols to be transmitted among a large number of subcarriers (also called frequency fingers), hence the term frequency division multiplexing. By carrying only a small amount of data on each subcarrier, the bit rate per subcarrier is kept low and hence inter-symbol interference is reduced. Data is modulated onto a subcarrier by adjusting its phase, amplitude, or both phase and amplitude.

The "orthogonal" part of the name OFDM refers to the fact that the spacings of the subcarriers are specially chosen so as to be orthogonal, in a mathematical sense, to the other subcarriers. This means that they are arranged along the frequency axis such that the sidebands of adjacent subcarriers are allowed to overlap but can still be received without inter-subcarrier interference. In mathematical terms, the sinusoidal waveforms of each subcarrier are called eigenfunctions of a linear channel, with the peak of each sinusoid coinciding with a null of every other sinusoid. This can be achieved by making the subcarrier spacing a multiple of the reciprocal of the symbol period.

When individual subcarriers or sets of subcarriers are assigned to different users of the wireless communication system, the result is a multi-access system referred to as OFDMA (Orthogonal Frequency Division Multiple Access). The term OFDM as used in the art is often intended to include OFDMA. The two terms may therefore be considered interchangeable for the purposes of the present explanation. By assigning distinct frequency/time resources to each user in a cell, OFDMA can substantially avoid interference among the users within a cell.

A further modification of the basic OFDM scheme is called MIMO-OFDM, where MIMO stands for multiple-input multiple-output. This type of scheme employs multiple antennae at the transmitter and/or at the user receiver (often at both) to enhance the data capacity achievable between the BS and each user station. For example, a 2×2 MIMO configuration contains two antennae at the transmitter and two antennae at the receiver; a 4×4 MIMO configuration contains four antennae at the transmitter and four antennae at the receiver. There is no need for the transmitter and receiver to employ the same number of antennae. Typically, a base station in a wireless communication system will be equipped with many more antennae in comparison with a mobile station (such as, for example, a mobile handset), owing to differences in power, cost and size limitations.

The term MIMO channel is used to describe the frequency (or equivalently time delay) response of the radio link between a transmitter and a receiver. The so-called MIMO channel (or "channel") contains all the sub-carriers, and covers the whole bandwidth of transmission. A MIMO channel contains many individual radio links. The number of these individual radio links, which may be individually referred to as single-input single-output (SISO) channels (also called sub-channels), is $N_t \times N_r$, where $N_t$ is the number of antennae at the transmitter and $N_r$ is the number of antennae at the receiver. For example, a 3×2 MIMO arrangement contains 6 links, hence it has 6 SISO channels.

Figure 1:
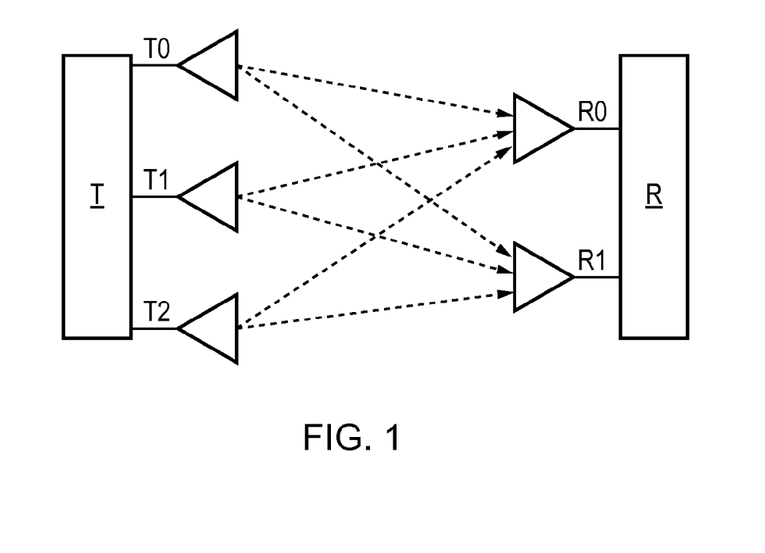
FIG. 1 is a schematic representation of a simplified 3×2 MIMO system and the individual SISO channels between the respective transmitter and receiver antennae.

Considering the simplified 3×2 MIMO system schematically represented in FIG. 1, it can be seen that antenna R0 of receiver R receives transmissions from each of the transmitter antennae T0, T1 and T2 of transmitter T. Similarly, receiver antenna R1 receives transmissions from transmitter antennae T0, T1 and T2. Therefore, the signal received at the receiver comprises (or is made up of) some combination of the transmissions (i.e. of the SISO channels) from the transmitter antennae. In general, SISO channels can be combined in various ways to transmit one or more data streams to the receiver.

Figure 2:
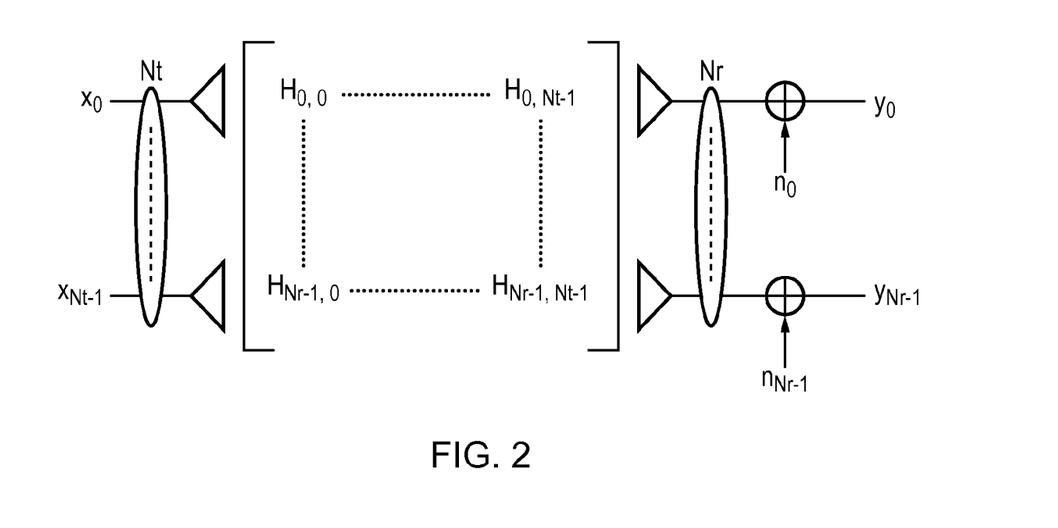

FIG. 2 is a conceptual diagram of a more generalized MIMO system. In FIG. 2, a transmitter transmits signals utilizing $N_t$ transmitting antennae, and a receiver receives the signals from the transmitter utilizing $N_r$ receiving antennae. In order to create a mathematical model of the characteristics of the overall MIMO channel, it is necessary to represent the individual SISO channels between the transmitter and receiver. As shown in FIG. 2, the individual SISO channels are represented by $H_{0,0}$ to $H_{Nr-1, Nt-1}$, and as suggested in the Figure, these form terms of a matrix commonly called the channel matrix or channel response matrix H. "$H_{0,0}$" represents the channel characteristics (for example, channel frequency response) for transmitting signals from the transmitting antenna 0 to the receiving antenna 0. Similarly, "$H_{Nr-1, Nt-1}$" represents the channel characteristics for transmitting signals from the transmitting antenna $N_t-1$ to the receiving antenna $N_r-1$, and so on.

In FIG. 2, the symbols $x_0$ to $x_{Nt-1}$, which represent the signal elements transmitted using the transmitting antennae 0 to $N_t-1$, together form a transmitted signal vector $\underline{x}$ (i.e. $\underline{x}=(x_0, x_1, x_2, \ldots, x_{NT-1})^T$). Likewise, the received signals elements $y_0$ to $y_{Nr-1}$ received by receiving antennae 0 to $N_r-1$ together form a received signal vector $\underline{y}$ (i.e. $\underline{y}=(y_0, y_1, y_2, \ldots, y_{Nr-1})^T$). The relationship between the vectors $\underline{y}$ and $\underline{x}$ may be modelled by the following basic mathematical MIMO system equation:

$$\underline{y}=H\underline{x}+\underline{n} \quad (I)$$

where H is the channel matrix described above and $\underline{n}$ is a vector representing noise. Noise elements $n_0$ to $n_{Nr-1}$ are illustrated in FIG. 2 and represent noise in the respective received signal elements $y_0$ to $y_{Nr-1}$. Hence, the noise vector $\underline{n}$ is given by $\underline{n}=(n_0, n_1, n_2, \ldots, n_{Nr-1})^T$. It is generally assumed for the purposes of the model given by equation (I) that the noise represented by vector $\underline{n}$ is Gaussian white noise with zero mean and variance $\sigma^2$.

The channel matrix H has a rank which is the number of linearly independent rows or columns thereof. When some of the rows or columns are linearly dependent, this indicates (and represents) correlation between individual subchannels (i.e. correlation between individual SISO channels) in the MIMO channel, and the channel matrix is said to be "rank deficient". When there is correlation between sub-channels, conventional receivers tend to perform poorly and the MIMO channel is incapable of providing the maximum data throughput.

It should be noted that, despite the name "multiple-input multiple-output", MIMO systems can operate even if one of the transmitter and the receiver has only one antenna (i.e. even if $N_t=1$ or $N_r=1$). In fact, MIMO systems might technically be said to operate even where the transmitter and the receiver both have only one antenna (i.e. where $N_t=N_r=1$), although this situation might be considered to constitute a special case because, in the mathematical model of the equation (I), the MIMO channel would then be represented by a scalar h rather than matrix H.

MIMO transmission schemes may be described as "non-adaptive" and "adaptive". In the non-adaptive case, the transmitter does not have any knowledge of the channel properties and this limits performance, as it cannot take account of changes in conditions (channel profile). Adaptive schemes rely on the feedback of information (channel-state information or CSI) from the receiver to the transmitter, allowing modification of the transmitted signal to account for changing conditions and to maximise data throughput. The present invention is concerned, at least primarily, with these adaptive MIMO schemes.

The feedback just described is important, in particular, in FDD (Frequency Division Duplex) systems, where uplink transmissions (i.e. transmissions from user station to base station) and downlink transmissions (vice-versa) employ two different carrier frequencies. Because of the frequency change, the uplink and downlink channels are different and CSI needs to be fed back in order to provide an adaptive scheme.

Aspects of the present invention could potentially find application in both downlink (i.e. transmissions from base station(s) acting as transmitter(s) to user(s) acting as receiver(s)) and uplink (i.e. transmissions from user(s) acting as transmitter(s) to base station(s) acting as a receiver(s)). However, at least in relation to certain embodiments, it is envisaged that the invention may be used to realise particular improvements in downlink transmissions. Therefore, whilst no limitation should be implied as to whether the invention may be applied to uplink or downlink transmissions, the invention will be described primarily with respect to downlink transmissions.

Figure 3:
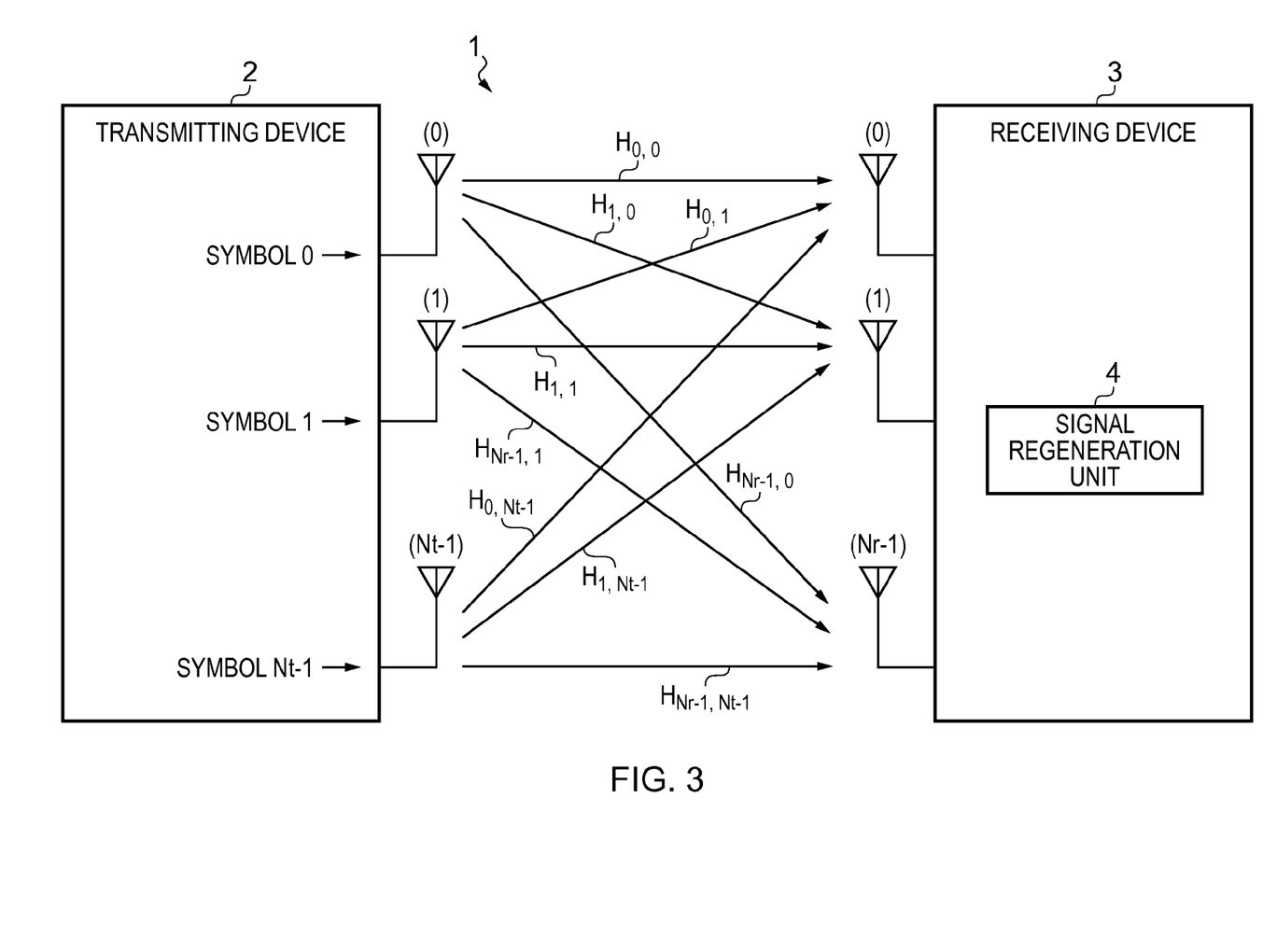
FIG. 3 is a schematic representation system similar to that given in FIG. 1, but relating to a more generalised MIMO system.

FIG. 3 is a diagram representing a MIMO system similar to that shown in FIG. 1, but more generalised. MIMO system 1 comprises a transmitter 2 which comprises a plurality of transmitting antennae (0), (1), ..., ($N_1-1$) and a receiver 3 which comprises a plurality of receiving antennae (0), (1), ..., ($N_r-1$). The transmitter 2 transmits symbols 0, 1, ..., $N_t-1$ using the $N_t$ transmitting antennae. The symbols can be created from one data stream, referred to as vertical encoding, or different data streams, referred to as horizontal encoding. In addition, each transmitted symbol corresponds to, for example, one-bit data if the modulation method is binary phase-shift keying (BPSK), or corresponds to two-bit data if the modulation method is quadrature phase-shift keying (QPSK). These concepts will be familiar to those skilled in the art. The receiver 3 receives the signals transmitted from the transmitting device 2 using the $N_r$ receiving antennae, and it comprises a signal regeneration unit 4 which regenerates the transmitted symbols from the signals received.

As indicated by the arrows in FIG. 3, the signals transmitted from a plurality of the transmitting antennae are received by a plurality of receiving antennae, giving rise to $N_t \times N_r$ possible subchannels in total. In other words, the signals transmitted from the transmitting antenna (0) are received by receiving antennae (0) through ($N_r-1$), the signals transmitted from the transmitting antenna (1) are received by receiving antennae (0) through ($N_r-1$), etc. The characteristics of the subchannel which propagates the signals from the i-th transmitting antenna to the j-th receiving antenna are expressed as "$H_{ji}$" and form one component term of the $N_r \times N_t$ channel matrix H. Those skilled in the art will recognise that if no signal is transmitted from a particular transmitting antenna i to a particular receiving antenna j, then the component $H_{ji}$ representing that subchannel in the channel matrix H would be zero.

Figure 4:
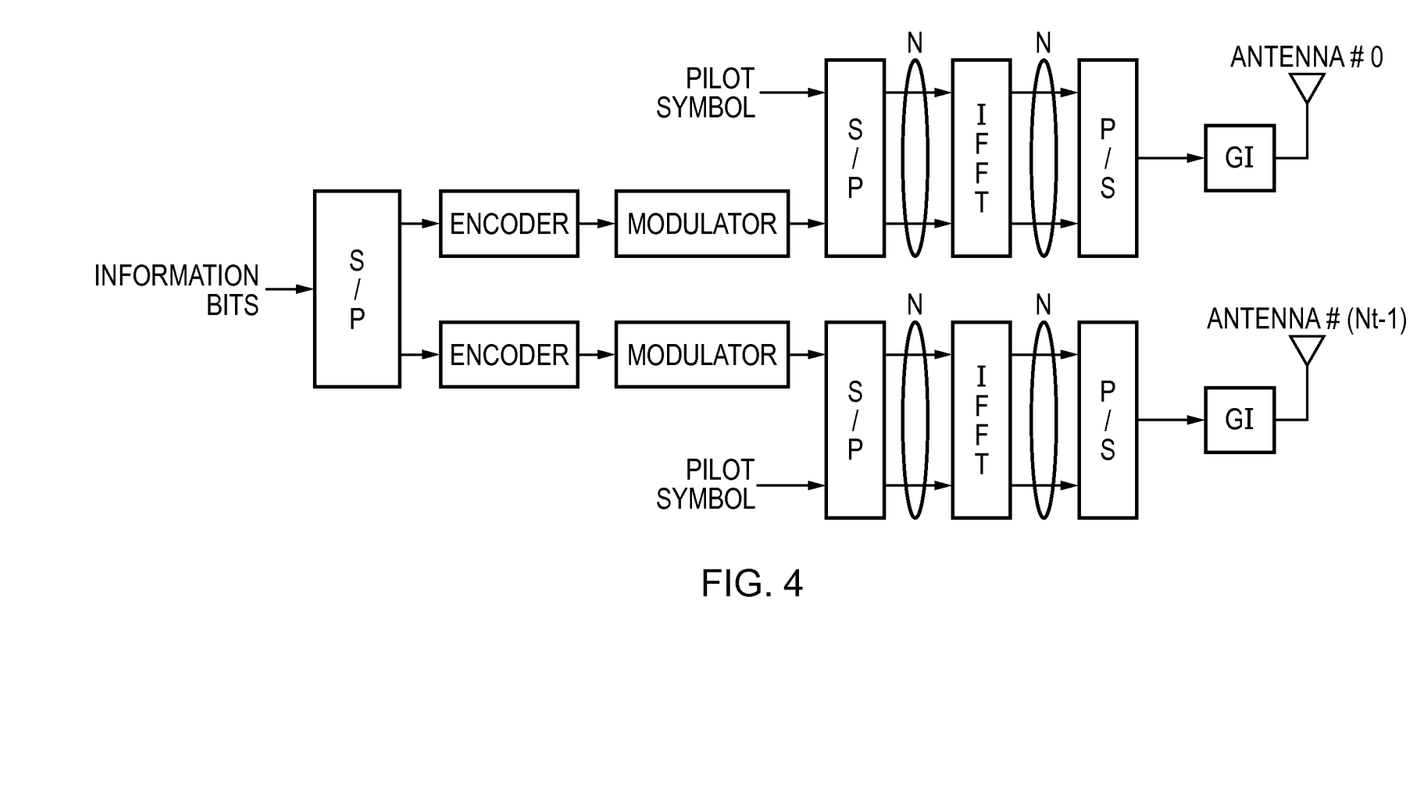
FIG. 4 is a schematic representation illustrating certain important functional components of a MIMO-OFDM transmitter.
Figure 5:
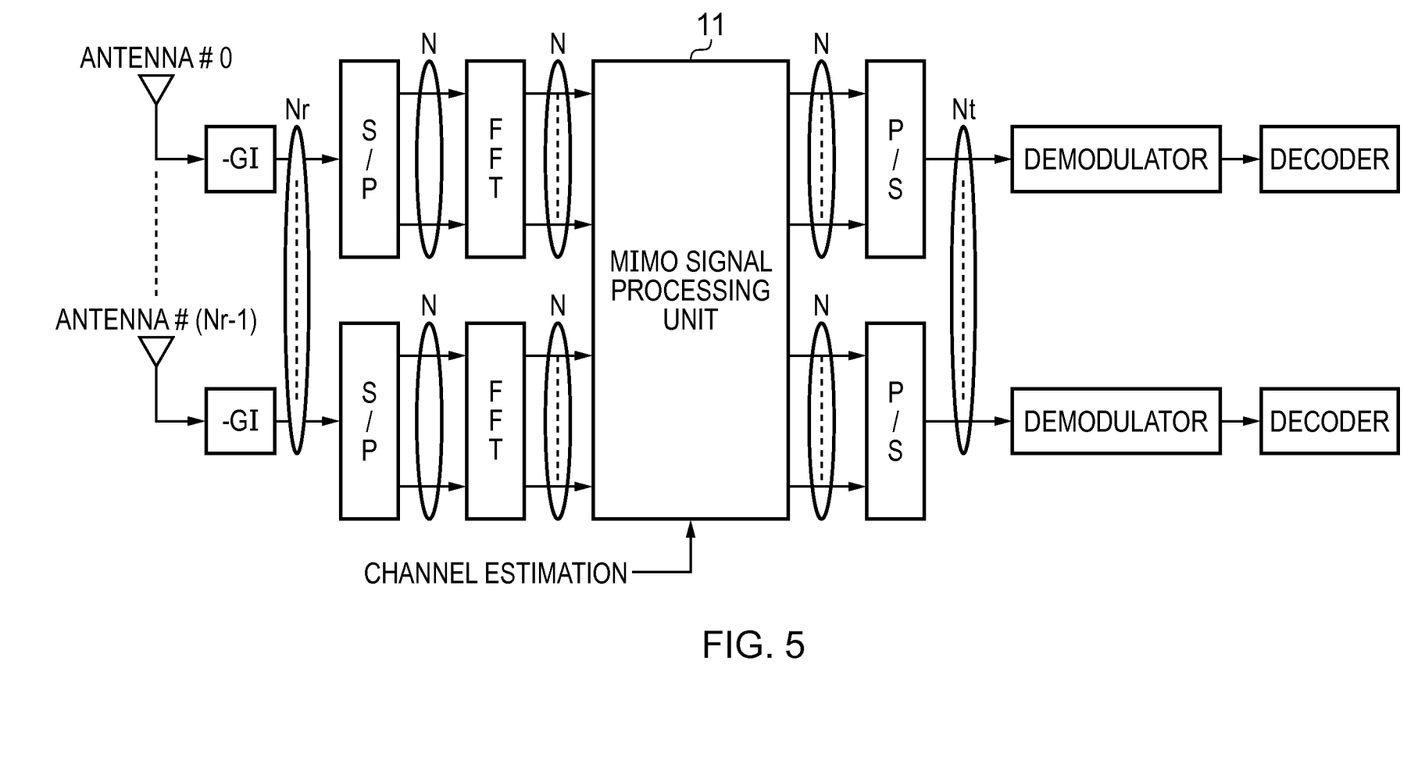
FIG. 5 is a schematic representation illustrating certain important functional components of a MIMO-OFDM receiver.

By way of further background explanation, a MIMO-OFDM transmitter and a MIMO-OFDM receiver will be briefly outlined with reference to FIGS. 4 and 5 respectively. In the OFDM transmitter schematically shown in FIG. 4, high-speed binary data is encoded (convolutional code is an example), interleaved, and modulated (using a modulation scheme such as BPSK, QPSK, 64QAM, and the like). Independent channel encoders may be used for each transmitting antenna. Subsequently, the data is converted into parallel low-speed modulated data streams which are fed to N sub-carriers. The output from each encoder is carried separately on a plurality of sub-carriers. The modulated signals are frequency-division multiplexed by N-point Inverse Fast Fourier Transform (IFFT) and the guard interval is added. The resulting OFDM signal is converted into an analog signal by a D/A converter and is upconverted into RF band and transmitted over the air.

At the MIMO-OFDM receiver schematically shown in FIG. 5, the received signals from the $N_r$ receiver antennae are filtered by a band pass filter (BPF), and then down-converted to a lower frequency. The down-converted signal is sampled by A/D converter (namely, converted into a digital signal), and the guard interval is removed before the sampled data is fed to the N-point Fast Fourier Transformer (FFT). After Fourier transformation is performed on each of the signals received through the $N_r$ receiver antennae, they are fed to the MIMO signal processing unit 11. The MIMO signal processing unit 11 comprises the signal regeneration unit 4 (as shown in FIG. 3) which performs processing (discussed further below) to compensate for the channel characteristics.

The discussion above of the transmitter (FIG. 4) and receiver (FIG. 5) is given by way of summary explanation only. Those skilled in the art will be generally familiar with such devices and the principles involved in their operation. It should also be noted that the above explanation has considered the case of a single transmitter sending MIMO signals to a single receiver, but of course a practical MIMO wireless communication system may be much more elaborate than this, providing many mutually-adjacent cells in each of which a base station transmits over respective MIMO channels to multiple user stations simultaneously.

Referring again to the basic MIMO system model represented by the equation (I) above, it will be recalled that when some of the rows or columns of the channel matrix H are linearly dependent (i.e. when the channel matrix H is rank deficient), this indicates that there is correlation between sub-channels. It will also be recalled that, where such correlation exists, conventional receivers tend to perform poorly.

Figure 6:
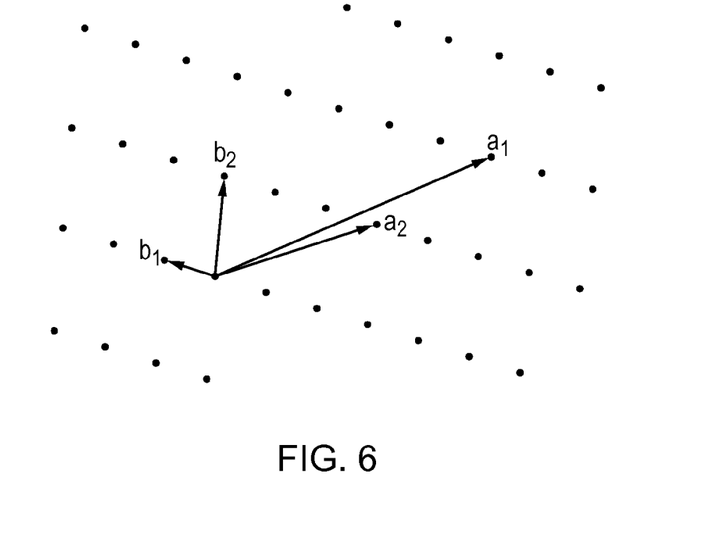
FIG. 6 is a graphical illustration of the principle of lattice reduction, using as an example a simple two-dimensional lattice.

A technique known as Lattice Reduction (LR) has been proposed for providing significant performance improvements in correlated MIMO channels. MIMO systems which utilise lattice reduction may be referred to as LR-MIMO systems. In mathematics generally, the goal of lattice reduction is, given a set of basis vectors for a lattice, to find a basis with short, nearly orthogonal vectors. For example, FIG. 6 gives a diagrammatic example of lattice reduction in two dimensions. In FIG. 6, the vectors $a_1$ and $a_2$ are the given basis vectors for the lattice represented by the vertices (i.e. the dots). The vectors $b_1$ and $b_2$ are nearly orthogonal basis vectors obtained using lattice reduction.

In the context of MIMO wireless communication systems having correlated MIMO channels, the purpose of lattice reduction is to transform the channel matrix H into a form where the rows and columns are more nearly orthogonal (i.e. so that the rows and columns are, in effect, more nearly linearly independent). Doing this helps to minimise the detrimental effects of correlation mentioned above. The matrix by which this transformation of the channel matrix H is affected is generally called the Lattice Reduction Matrix P.

In many practical implementations of MIMO wireless communication systems, the user station may be, for example, a mobile handset, and may therefore have limited resources in terms of power, data processing/computational capacity and data transmission/reception capacity. Certainly, the power, processing and transmission/reception resources in mobile handsets and the like are generally much more limited than the power, processing and transmission/reception resources of a base station (BS). This is a significant impediment to, and significantly increases costs associated with, practical implementations of LR-MIMO systems.

The impediment created by the limited resources of a user station compared with a base station (BS) is particularly significant in relation to the burden placed on the data processing and transmission/reception resources of the user station, and especially where the user station is a mobile station (e.g. a mobile handset), although it may often also be significant where the user station is of a fixed position type. Aspects of the present invention may go at least some way to helping address this problem.

Also, the limited resources of a user station make it difficult, or at least less preferable, to calculate the lattice reduction matrix P at the receiver. It would therefore be desirable to calculate the lattice reduction matrix at the transmitter and to transmit the Lattice Reduction Matrix P from the transmitter to the receiver. However, this would be in addition to the signal $\underline{x}$ which needs to be transmitted from the transmitter to the receiver. Therefore, the need to transmit the Lattice Reduction Matrix P imposes an additional burden on the transmission resources of the system. Aspects of the present invention may at least help to reduce this additional transmission burden as well.

SUMMARY OF THE INVENTION

In one form, the invention (or an embodiment thereof) may be considered to relate, in broad terms, to a wireless communication system comprising:
  a transmitter operable to transmit a transmitted signal, the transmitter having one or more transmitting antennae; and
  a receiver operable to receive a received signal, the receiver having one or more receiving antennae;
  wherein lattice reduction is used in obtaining, at the receiver, an estimate of the transmitted signal based on the received signal,
  characterised in that the lattice reduction utilises a lattice reduction matrix, a decomposed representation of which is transmitted between the transmitter and the receiver.

In another form, the invention (or an embodiment thereof) may be considered to relate, in broad terms, to a transmitter for use in a wireless communication system, the transmitter comprising:
  one or more transmitting antennae operable to transmit a transmitted signal to a receiver which has one or more receiving antennae operable to receive a received signal; and
  means for calculating a lattice reduction matrix which is used in obtaining, at the receiver, an estimate of the transmitted signal based on the received signal;
  wherein the transmitter is operable to transmit a decomposed representation of the lattice reduction matrix to the receiver.

In a further form, the invention (or an embodiment thereof) may be considered to relate, in broad terms, to a method for use in a wireless communication system which incorporates a transmitter for transmitting a transmitted signal using one or more transmitting antennae and a receiver for receiving a received signal using one or more receiving antennae, wherein a lattice reduction matrix is used in obtaining, at the receiver, an estimate of the transmitted signal based on the received signal, the method comprising:
  transmitting the transmitted signal from the transmitter to the receiver,
  calculating the lattice reduction matrix, and finding a decomposed representation thereof, at the transmitter;
  transmitting the decomposed representation of the lattice reduction matrix from the transmitter to the receiver; and
  at the receiver, reconstructing the lattice reduction matrix and using it to obtain an estimate of the transmitted signal based on the received signal.

It is envisaged that the invention, in its various forms and embodiments, will typically be implemented as (or in) so-called MIMO wireless communication systems. Therefore, for the remainder of this specification, the invention will be described with reference to MIMO wireless communication systems or so-called MIMO schemes. However, no particular limitation is to be applied from this. In particular, no limitation is to be implied with regard to the number of antennae required to be present at either the transmitter or the receiver.

In preferred embodiments of each of the forms of the invention described in broad terms above, the transmitter may be a transmitter of a base station, the receiver may be a receiver of a user station (in other words, the invention may find particular use, and provide particular benefits in relation to, downlink transmissions), and the lattice reduction matrix may be calculated at the base station such that the decomposed representation of the lattice reduction matrix may be transmitted from the base station to the user station. One of the benefits provided by these preferred embodiments is that they enable transfer of the computationally complex calculation of the lattice reduction matrix from the user station to the base station while incurring only moderate signalling overheads due to efficient signalling of the lattice reduction matrix, namely in a decomposed form, from the base station to the user station. This can therefore enable performance improvement using, in particular, simple conventional receiver structures.

In the embodiments described above, the transmitter (and the one or more antennae thereof) may take any form suitable for implementation in a lattice reduction MIMO (LR-MIMO) scheme. FIG. 4 illustrates schematically certain important functional components of one form of transmitter that may be suitable. However, the invention is not limited to the use of this or any other particular kind of transmitter.

Similarly, the receiver (and the one or more antennae thereof) may also take any form suitable for implementation in a lattice reduction MIMO (LR-MIMO) scheme. In fact, as mentioned above, one of the benefits provided by the present invention (or at least by certain embodiments thereof) is that simple/unmodified/conventional receivers can be used but improvements can be achieved compared with the performance of those receivers without the present invention. FIG. 5 illustrates schematically certain important functional components of one form of receiver that may be suitable. However, the invention is not limited to the use of this or any other particular kind of receiver.

As explained above, the so-called MIMO channel in MIMO wireless communication schemes can be mathematically represented by a matrix, namely the so-called channel matrix, and where there is correlation between the individual SISO channels which make up the MIMO channel, this can be represented by rank deficiency of the channel matrix (i.e. by linear dependence between at least certain of the rows and columns of the channel matrix). Lattice reduction is used in the various embodiments of the present invention in order to obtain, at the receiver, an improved estimate of the transmitted signal based on the received signal (i.e. an estimate of the signal transmitted by the transmitter based on the signal received by the receiver). Lattice reduction helps to minimise detrimental effects (e.g. on receiver performance etc) caused by correlation in the MIMO channel.

In the preferred embodiments discussed above, the transmitter is a transmitter of a base station, the receiver is a receiver of a user station, and the lattice reduction matrix is calculated at the base station so that the computationally complex calculation of the lattice reduction matrix is transferred to the base station (which typically has greater computational resources than the user station). It has also been explained that, in the present invention (or at least most embodiments thereof), a decomposed representation of the lattice reduction matrix is transmitted from the base station to the user station. In other words, rather than transmitting the lattice reduction matrix itself (or the individual entries thereof), a decomposed form of the lattice reduction matrix is transmitted, and this enables the invention to achieve significant savings in terms of signalling overheads.

In the present invention, the lattice reduction matrix may preferably be a unimodular matrix. Furthermore, the decomposed representation of the lattice reduction matrix may preferably comprise one or more totally unimodular matrices, the product of which is (or equals) the lattice reduction matrix. In other words, the decomposed representation of the lattice reduction matrix may preferably comprise one or more totally unimodular matrices which, when multiplied together, give (or equal) the lattice reduction matrix.

In embodiments where the lattice reduction matrix and the decomposed representation thereof meet the description given in the previous paragraph, a set of totally unimodular matrices may be provided. In arriving at the lattice reduction matrix decomposition (i.e. the decomposed representation of the lattice reduction matrix), one or more of the totally unimodular matrices from the set may be chosen such that the product of the chosen totally unimodular matrices equals the lattice reduction matrix. Those skilled in the art will recognise that, at least in some instances, there may be multiple different product combinations of totally unimodular matrices from the set which equal the lattice reduction matrix. In other words, there may be more than one different combination of totally unimodular matrices in the set which, when multiplied together, equal the lattice reduction matrix. It is possible that any such combination may be used as the decomposed representation of the lattice reduction matrix for the purposes of the invention. However, it may be preferable to choose combinations involving the least number of totally unimodular matrices, or the least number of different totally unimodular matrices (see powers discussed below), so as to minimise the amount of information to be transmitted (i.e. minimise the signalling overhead associated with transmitting the lattice reduction matrix decomposition).

An identifying index may be assigned to each of the totally unimodular matrices in the above-mentioned set. Therefore, in transmitting the decomposed representation of the lattice reduction matrix from the base station to the user station, rather than transmitting the chosen totally unimodular matrices from the set whose product equals the lattice reduction matrix (i.e. rather than transmitting the totally unimodular matrices themselves or the individual elements thereof), only the identifying index for each of those chosen totally unimodular matrix is transmitted. In this way, a significant saving may be achieved in terms of the signalling overhead associated with transmitting the lattice reduction matrix decomposition.

Those skilled in the art will recognise that, in many instances, a particular totally unimodular matrix may appear in the lattice reduction matrix decomposition more than once. In other words, in the combination of totally unimodular matrices which equals the lattice reduction matrix when multiplied together, a particular totally unimodular matrix may be multiplied by itself one or more times. In fact, there may be more than one totally unimodular matrix, each multiplied by itself one or more times. In these situations, rather than transmitting the index for each such totally unimodular matrix the required number of times, a power m may be transmitted for each such totally unimodular matrix (where m−1 is the number of times that totally unimodular matrix is multiplied by itself). Therefore, as an example, if a particular totally unimodular matrix D were multiplied by itself three times (i.e. D×D×D×D=$D^4$), instead of transmitting the identifying index for matrix D four times as part of the transmitted lattice reduction matrix decomposition, the same information may be transmitted by transmitting the identifying index for matrix D once along with the power four (i.e. m=4). In this way, the number of bits required to be transmitted in order to represent totally unimodular matrices multiplied by themselves one or more times in the lattice reduction matrix decomposition may be reduced.

BRIEF DESCRIPTION OF THE DRAWINGS

The drawings associated with this specification help to explain the background of the invention. They also help to explain certain features and aspects of the invention. However, it will be clearly understood that the drawings are given for the purposes of explanation and to assist understanding only, and the invention is not necessarily limited to or by any of the background information, features or aspects shown in, or described with reference to, the drawings. In the drawings:

FIG. 2 is a conceptual diagram of a more generalized MIMO system in which the transmitter has $N_t$ transmitting antennae, and the receiver has $N_r$ receiving antennae. FIG. 2 also schematically represents the introduction of noise into the signals received by the receiving antennae.

DETAILED DESCRIPTION OF ASPECTS AND EMBODIMENTS OF THE INVENTION

It will be recalled from the background section above that the relationship between the signal $\underline{y}$ received by the receiver and the signal $\underline{x}$ transmitted by the transmitter in a typical MIMO system may be modelled using the basic mathematical model given in equation (I) (which is repeated below):

$$\underline{y} = H\underline{x} + \underline{n} \qquad (I)$$

Figure 7:
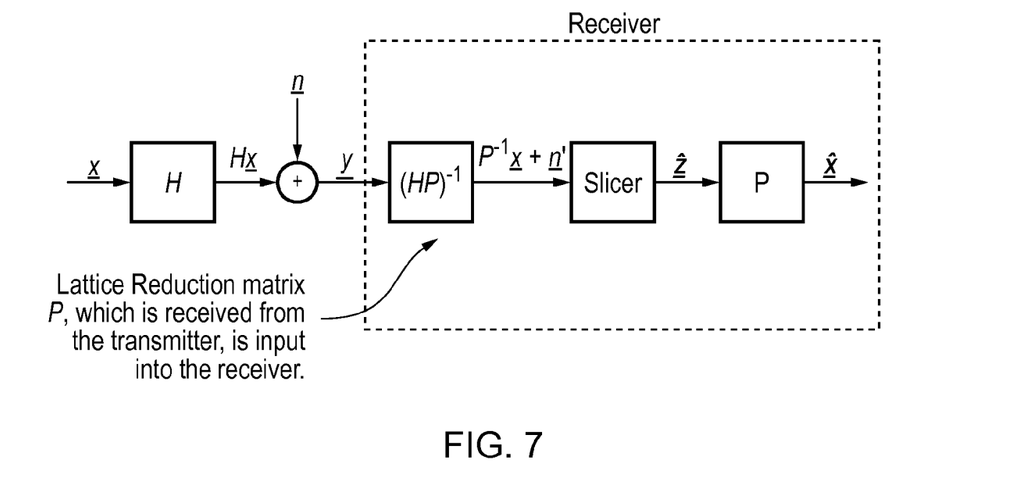
FIG. 7 is a block diagram illustrating a MIMO wireless communication system according to the mathematical model of equation (I), and also illustrating some further processing performed by the receiver. The MIMO wireless communication system in FIG. 7 is of a kind to which the present invention may be applied.

FIG. 7 is a block diagram illustrating a MIMO system according to this mathematical model, and also illustrating some further processing performed by the receiver. The MIMO wireless communication system in FIG. 7 is of a kind to which the present invention may be applied. However, it should be noted that the invention is not necessarily limited to implementation in systems corresponding to this representation.

In FIG. 7, the source signal $\underline{x}$ is transmitted from (the multiple antennae) of the transmitter "over the air" (as described above), and the effect of this is represented in the model by pre-multiplying the source signal vector $\underline{x}$ by the channel matrix H to give the quantity $H\underline{x}$ shown in FIG. 7. The noise component $\underline{n}$ is then added, thus giving the signal $\underline{y}$ received by the (multiple antennae of the) receiver, as per the model in equation (I).

It will also be recalled from the background section above that, in LR-MIMO systems, the purpose of lattice reduction is to transform the channel matrix H into a form in which the rows and columns are more nearly orthogonal (i.e. so that the rows and columns are, in effect, more nearly linearly independent). This helps to minimise the detrimental effects (such as impeded receiver performance) of correlation in the MIMO channel, which is represented in the mathematical model (I) by correlation between the rows and columns of the channel matrix H. As explained above, the matrix by which this transformation of the channel matrix H is affected is generally called the Lattice Reduction Matrix P.

One of the major complexities associated with practical implementations of LR-MIMO lies in the calculation of the Lattice Reduction Matrix P. However, the method used to calculate the Lattice Reduction Matrix P is not critical to the present invention. Therefore, for the purposes of the present invention, the Lattice Reduction Matrix P may be obtained using any suitable technique. One known algorithm which is suitable for this purpose is commonly referred to as the LLL algorithm. This algorithm is well documented, and the following document is a good reference for it:

L. Lovasz, "An Algorithmic Theory of Numbers, Graphs and Convexity", Philadelphia, USA: Society for Industrial and Applied Mathematics, 1986.

Whilst the Lattice Reduction Matrix P may be obtained using the known LLL algorithm, or alternatively any other suitable algorithm (it being recalled that the means by which it is obtained is not critical to the present invention), nevertheless finding the Lattice Reduction Matrix P (irrespective of which algorithm or technique is used) generally requires an iterative process. The calculation of the Lattice Reduction Matrix P therefore requires considerable power and computational resources. To address this issue, in some embodiments of the present invention, and in particular the embodiments described in detail here, the calculation of lattice reduction matrix P is performed at the base station (which generally has far greater power, processing and transmission/reception resources than a mobile station) and then transmitted to the user station (which could be a mobile station or a fixed subscriber station etc). Consequently, the embodiments described here relate primarily to downlink transmissions. However, as explained above, no limitation should be implied from this, and the present invention may be applicable to downlink or uplink.

In order for the transmitter to calculate the lattice reduction matrix P it must have knowledge of the channel seen by the receiver. In the FDD (Frequency Division Duplex) systems mentioned above where uplink transmissions (user to base station) and downlink transmissions (vice-versa) employ different carrier frequencies, this may be achieved by feeding channel state information (CSI) back from the receiver to the transmitter (i.e. transmitting information pertaining to the channel H back to the transmitter). Alternatively, in so-called TDD (Time Division Duplex) systems, the uplink and downlink are transmitted in two adjacent time slots on the same frequency. If the two time slots are within the channel coherence time (i.e. the channel does not change) then the channel state information need not be fed back. Therefore, in TDD systems, channel reciprocity may be exploited in order to calculate the lattice reduction matrix P at the transmitter.

In FIG. 7, the dashed box represents the receiver, and the contents of the dashed box represent the processing of the signal after it has been received by the receiver. It should be noted from FIG. 7 that the receiver receives from the transmitter not only the signal $\underline{y}$, but also the Lattice Reduction Matrix P which is calculated at the transmitter (as explained above). After the signal $\underline{y}$ is received by the receiver, it is "equalized". In FIG. 7, a particular form of equalization known as "Zero Forcing" is illustrated which involves pre-multiplying the received signal $\underline{y}$ by the quantity $(HP)^{-1}$. It will be recognised that, implicit in this equalization, is the assumption that the channel characteristics can be represented by the channel matrix H when transformed by the lattice reduction matrix P (i.e. it is assumed that the channel can be represented by the quantity HP). Whilst FIG. 7 illustrates the use of Zero Forcing equalization, it is to be understood that other equalization methods might also be used such as, for example, Minimum Mean Square Error (MMSE) and Successive Interference Cancellation (SIC). The particular form of equalization is not therefore critical to the present invention. The result of the zero forcing equalization shown in FIG. 7 (i.e. the result of pre-multiplying the received signal $\underline{y}$ by the quantity $(HP)^{-1}$) is as follows. Given that $\underline{y}=H\underline{x}+\underline{n}$ from equation (I), and defining that $\underline{n}'=(HP)^{-1}\underline{n}$ (i.e. $\underline{n}'$ is simply a convenient notation for the resultant noise vector transformation), it follows that the result of the zero forcing is given by:

$$(HP)^{-1}\underline{y}=(HP)^{-1}(H\underline{x}+\underline{n})=(HP)^{-1}H\underline{x}+(HP)^{-1}\underline{n}=P^{-1}\underline{x}+\underline{n}'$$

After the zero forcing equalization, the signal is then passed through a slicer. The slicer quantizes each entry of the equalized signal to the nearest constellation symbol and obtains a hard estimate of $\hat{\underline{z}}$, where $\hat{\underline{z}}=P^{-1}\underline{x}$. Finally, the receiver obtains an estimate $\hat{\underline{x}}$ of the source signal (i.e. $\hat{\underline{x}}$ is an estimate of the original signal $\underline{x}$ transmitted by the transmitter) by pre-multiplying the estimate $\hat{\underline{z}}$ by the lattice reduction matrix P; i.e. $\hat{\underline{x}}=P\hat{\underline{z}}$. One of the specific reasons why lattice reduction provides performance improvements in correlated MIMO channels is because transforming the channel matrix H into a form in which the rows and columns are more nearly orthogonal improves the performance, and in particular the decision boundaries, of the slicer. This is explained in further detail in the following document which is a good reference:

H. Yao and G. W. Wornel, "Lattice-Reduction-Aided Detectors for MIMO Communication Systems", Proc. Global Commun. Conf. (GLOBECOM-2002), Taiwan, November 2002

One of the benefits that the present invention may desirably achieve is that, for a given transmission, the demands placed on the systems' limited reception resources can be reduced by the way in which the lattice reduction matrix P is transmitted from the transmitter to the receiver. Specifically, by transmitting a decomposed representation of the lattice reduction matrix P from the transmitter to the receiver, rather than transmitting the full lattice reduction matrix itself, the present invention may reduce the demands placed on the systems' reception resources. This may be particularly important for the receiver where the receiver is a user station (e.g. a mobile handset or the like) which may have relatively very limited reception and power/data processing resources.

Decomposing the lattice reduction matrix P reduces the number of bits required to represent the matrix (compared with the number of bits required to represent each individual entry in the un-decomposed matrix), and therefore it reduces the number of bits required to be transmitted from the transmitter to the receiver. In other words, rather than quantizing the individual entries of the lattice reduction matrix P for transmission from the transmitter to the receiver, the present invention decomposes the matrix P to reduce the number of bits required to be transmitted.

In the preferred embodiments of the invention explained hereafter, the lattice reduction matrix P is decomposed by exploiting the fact that the matrix P is a unimodular matrix. Those skilled in the art will recognise that a unimodular matrix is defined as a matrix that has a determinant or +1 or −1 and which has only integer entries (although the entries may be real or complex integers). Furthermore, in these preferred embodiments, the unimodular matrix P is decomposed into one or more (typically multiple) totally unimodular matrices. Again, those skilled in the art will recognise that a totally unimodular matrix is defined as a matrix for which every square non-singular submatrix is unimodular. From this definition, it follows that a totally unimodular matrix need not be square itself, but any totally unimodular matrix has only 0, +1, −1, i, or −i, entries.

One particular benefit of these preferred embodiments is that only a limited number of totally unimodular matrices are required to decompose the original matrix P. These totally unimodular matrices may be referred to as decomposition matrices. The limited number of decomposition matrices may be considered to comprise a set of decomposition matrices.

The operation of certain aspects of the invention will be described below with reference to a simplified example 2×2 MIMO system (i.e. a system in which there are two transmitting antennae and two receiving antennae, and in which the channel could hence be represented by a 2×2 channel matrix H). It will, of course, be understood that the principles described with reference to this simple example may be extended to systems having a far greater number of degrees of freedom (i.e. having a greater number of transmitting and/or receiving antennae).

The totally unimodular decomposition matrices listed in the table below may be used to decompose a 2×2 lattice reduction matrix P by performing elementary row and column operations. Specifically, matrices $D_0$ to $D_3$ perform column and row permutations, while matrices $D_4$ to $D_{11}$ perform column and row additions. Note that the decomposition matrices shown in the table below are not unique, and it would be possible to use other decomposition matrices to perform elementary row and column operations.

| Decomposition Matrix Index | Totally Unimodular Decomposition Matrix |
|---|---|
| $D_0$ | $\begin{bmatrix} 1 & 0 \\ 0 & 1 \end{bmatrix}$ |

| Decomposition Matrix Index | Totally Unimodular Decomposition Matrix |
|---|---|
| $D_1$ | $\begin{bmatrix} 1 & 0 \\ 0 & -1 \end{bmatrix}$ |
| $D_2$ | $\begin{bmatrix} 0 & 1 \\ 1 & 0 \end{bmatrix}$ |
| $D_3$ | $\begin{bmatrix} 0 & 1 \\ -1 & 0 \end{bmatrix}$ |
| $D_4$ | $\begin{bmatrix} 1 & 1 \\ 0 & 1 \end{bmatrix}$ |
| $D_5$ | $\begin{bmatrix} 1 & 0 \\ 1 & 1 \end{bmatrix}$ |
| $D_6$ | $\begin{bmatrix} 1 & -1 \\ 0 & 1 \end{bmatrix}$ |
| $D_7$ | $\begin{bmatrix} 1 & 0 \\ -1 & 1 \end{bmatrix}$ |
| $D_8$ | $\begin{bmatrix} 1 & i \\ 0 & 1 \end{bmatrix}$ |
| $D_9$ | $\begin{bmatrix} 1 & 0 \\ i & 1 \end{bmatrix}$ |
| $D_{10}$ | $\begin{bmatrix} 1 & -i \\ 0 & 1 \end{bmatrix}$ |
| $D_{11}$ | $\begin{bmatrix} 1 & 0 \\ -i & 1 \end{bmatrix}$ |

As an illustration, consider a lattice reduction matrix P given by:

$$P = \begin{bmatrix} 1 & 1 \\ 1 & 2 \end{bmatrix}$$

In this example, the given lattice reduction matrix P can be decomposed using decomposition matrices from the table above as follows:

$$P = D_5 \; D_4$$
$$\begin{bmatrix} 1 & 1 \\ 1 & 2 \end{bmatrix} = \begin{bmatrix} 1 & 0 \\ 1 & 1 \end{bmatrix}\begin{bmatrix} 1 & 1 \\ 0 & 1 \end{bmatrix}$$

Therefore, in the above example, instead of signalling the individual entries of the lattice reduction matrix P, indices associated with decomposition matrices $D_5$ and $D_4$ can be signalled. Those skilled in the art will recognise that the receiver must have knowledge of the indices associated with each decomposition matrix, as used by the transmitter, in order to be able to reconstruct the lattice reduction matrix from the received indices. Therefore, after the receiver has identified (from the received indices) the totally unimodular matrices that form the matrix decomposition (it also being appreciated that the order in which the totally unimodular matrices appear in the decomposition is also transmitted by the transmitter, either by sending the relevant indices in their correct order or by some other means), the receiver can then reconstruct the lattice reduction matrix P by multiplying the said totally unimodular matrices together.

It is also necessary to signal the number of decomposition matrices in the overall decomposition of the lattice reduction matrix because, depending on the lattice reduction matrix, a varying number of decomposition matrices may be required. Even so, this approach significantly reduces the signalling overhead associated with transmitting the lattice reduction matrix from the base station transmitter to the user station receiver, as described further below.

In cases where there is significant correlation in the MIMO channel (i.e. significant correlation between individual SISO channels, this being represented by correlation in the rows and columns of the channel matrix H), the decomposition of the lattice reduction matrix P can result in repeated multiplications of the same decomposition matrix. As an example, if the lattice reduction matrix P is given by $$P = \begin{bmatrix} 1 & 1 \\ 2 & 3 \end{bmatrix}$$

then a resultant decomposition would be:

$$P = D_5 \; D_5 \; D_4 = D_5^2 \; D_4$$
$$\begin{bmatrix} 1 & 1 \\ 2 & 3 \end{bmatrix} = \begin{bmatrix} 1 & 0 \\ 1 & 1 \end{bmatrix}\begin{bmatrix} 1 & 0 \\ 1 & 1 \end{bmatrix}\begin{bmatrix} 1 & 1 \\ 0 & 1 \end{bmatrix} = \begin{bmatrix} 1 & 0 \\ 1 & 1 \end{bmatrix}^2\begin{bmatrix} 1 & 1 \\ 0 & 1 \end{bmatrix}$$

In cases such as this (and even more so in instances where more than one of the decomposition matrices is multiplied by itself one or more times in the overall decomposition), additional savings in terms of signalling overhead may be achieved by signalling the indices associated with the relevant decomposition matrices ($D_5$ and $D_4$ in the example above), and additionally signalling a power for each or some of the decomposition matrices (in the example above that power 2 is signalled for $D_5$ and the power 1 is signalled for $D_4$).

The examples above illustrate how the present invention enables significant savings to be made in terms of the signalling overhead associated with transmitting the lattice reduction matrix from the transmitter to the receiver. However, in order to realise these advantages, means must be provided for determining a decomposition of a given lattice reduction matrix. Strictly speaking, the means by which the decomposition of the lattice reduction matrix is obtained is not critical to the invention, and therefore any suitable means or method could be used. One method for determining a decomposition of the lattice reduction matrix is explained below. However, it is to be understood that the invention is not necessarily limited to this particular method, and other methods might alternatively be used.

In general terms, the presently described method involves an iterative process of pre- or post-multiplying the lattice reduction matrix P with all candidate decomposition matrices in order to perform elementary row or column operations. In each iteration, the decomposition matrix D, which yields the smallest Frobenius norm when pre- or post-multiplied with the lattice reduction matrix is chosen. Those skilled in the art will be familiar with matrix and vector norms, of which the Frobenius norm is simply one example. The Frobenius norm has been chosen in the particular method presently described, although a range of other norms might alternatively be used. The process terminates when the resulting matrix equals (or alternatively equals a scalar multiple of) one of the decomposition matrices.

The process discussed in general terms in the previous paragraph may be more fully understood with reference to the following pseudo code. The operation of each line in the pseudo code is explained on the right.

| 1. Define $norm_{min}$ = infinity; n = 0;$P_1$ = P | Initialise the minimum norm, iteration number n, and LR transform matrix $P_n$ respectively |
|---|---|
| 2. REPEAT | Continue iterating until condition in 3 below is met |
| (A). n = n+1 | Update iteration number |
| (B). FOR all $D_i$ = {$D_4,D_5,...,D_{11}$} | Try all candidate decomposition matrices |
| (I). P'= $P_nD_i$ | Calculate an intermediate matrix by post-multiplying the LR transform matrix by the current decomposition matrix |
| (II). IF $\|P'\|$ < $norm_{min}$ | If the norm of the intermediate matrix is the smallest so far, proceed with (i), (ii) and (iii) below |
| (i). $norm_{min}$ = $\|P'\|$ | Store the norm of the intermediate matrix |
| (ii). $D_n$ = $D_i$ | Store the decomposition matrix for iteration n |
| (iii). $P_{n+1}$ = P' | Store the intermediate matrix for the next iteration |
| END IF | |
| (III). P' = $D_iP_n$ | Calculate the intermediate matrix by pre-multiplying the LR transform matrix by the current decomposition matrix |
| (IV). IF $\|P'\|$ < $norm_{min}$ | If the norm of the intermediate matrix is the smallest so far, proceed with (i), (ii) and (iii) below |
| (i). $norm_{min}$ = $\|P'\|$ | Store the norm of the intermediate matrix |
| (ii). $D_n$ = $D_i$ | Store the decomposition matrix for iteration n |
| (iii). $P_{n+1}$ = P' | Store the intermediate matrix for the next iteration |
| END IF | |
| V. $P_n$ = $P_{n+1}$ | Update the LR transform matrix |
| END FOR | |
| 3. UNTIL $P_n \in k$ {$D_1,D_2,...,D_{11}$} | |

In the above pseudo code, $\|.\|$ denotes the Frobenius norm and k is a scalar factor. It will be recognised that the process represented by the pseudo code above produces a decomposition of the form, for example:

$$D_6P=D_2$$

This can easily be transformed into the desired decomposition format by performing matrix inversion. For example:

$$D_6^{-1}D_6P=D_6^{-1}D_2$$

From the above table it will be noted that, in this example, $D_6^{-1}=D_4$. Therefore $$P=D_4D_2$$

This illustrates one example of a process by which the lattice reduction matrix P may be decomposed into a series of one or more totally unimodular decomposition matrices. As noted above, other processes for achieving this purpose are possible.

Discussion of Performance Results

The effectiveness of the efficient signalling provided by the present invention in transmitting the lattice reduction matrix P has been assessed with link level simulations in a 2×2 MIMO system. For the purposes of overhead calculation, the following amounts of data were assumed:

| Standard Signalling | Signalling According to the Present Invention |
|---|---|
| per complex valued matrix element 8 bits (3 bits resolution + 1 sign bit, for each of the real and imaginary parts) | per decomposition matrix 4 bits. The actual overhead depends on the number of matrices required for the decomposition of the lattice reduction matrix P. In order to signal the number of matrices an additional 4 bits were assumed. |

The overhead results summarized in the table below were obtained by averaging over 2000 random Rayleigh flat fading channels with either low ($\alpha$=0.1) or high ($\alpha$=0.9) spatial channel correlation, where $\alpha$ is the channel correlation coefficient. The number of bits using decomposition includes a 4 bit overhead which indicates the number of totally unimodular matrices used in the decomposition.

| | Channel correlation low ($\alpha$ = 0.1) | Channel correlation high ($\alpha$ = 0.9) |
|---|---|---|
| Number of bits required according to the present invention | 9.76 | 18.64 |
| Number of bits required with standard signalling | 32 | 32 |
| Relative overhead reduction using signalling according to present invention | 69.5% | 41.75% |

From the results shown in the table above, it will be seen that the efficient signalling provided by the present invention can reduce the overhead by about 40% in highly correlated channels and by about 70% in channels with low-level correlation.

Figure 8:
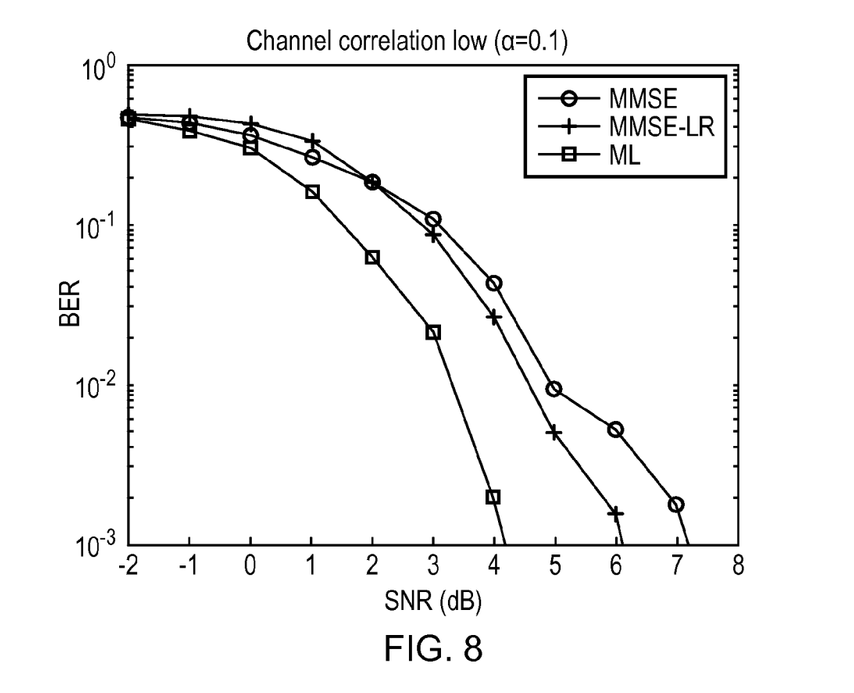
FIG. 8 is a graph illustrating Bit Error Rates (BER) vs Signal to Noise (SNR) results obtained using lattice reduction according to the present invention in a channel with low spatial correlation.
Figure 9:
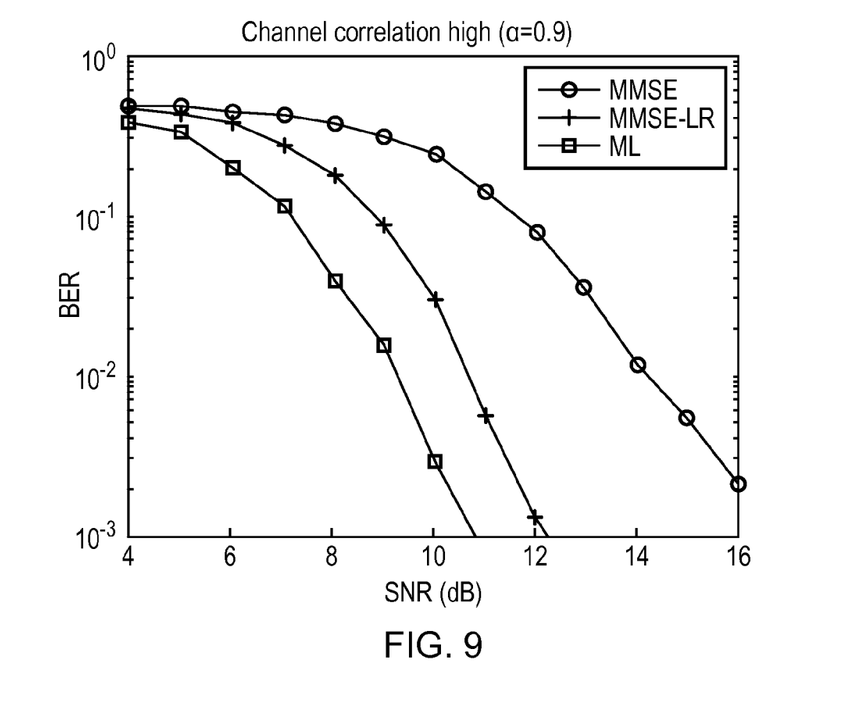
FIG. 9 is a graph illustrating Bit Error Rates (BER) vs Signal to Noise (SNR) results obtained using lattice reduction according to the present invention in a channel with high spatial correlation.

The graphs in FIGS. 8 and 9 illustrate Bit Error Rates (BER) vs Signal to Noise (SNR) results that were obtained with a linear MMSE receiver using lattice reduction according to the present invention, and using the same settings as for the overhead results given in table above. Specifically, FIG. 8 plots BER vs SNR performance in a channel with low spatial correlation, and FIG. 9 plots BER vs SNR performance in a channel with high spatial correlation. The graphs illustrate that, in correlated MIMO channels, lattice reduction and signalling according to the present invention enabled significant gains to be made over traditional linear MMSE receiver performance. In fact, performance approaches the performance of the optimal but computationally complex Maximum Likelihood (ML) receiver, as shown FIG. 9.

Possible Applications of the Present Invention

Various aspects and embodiments of the invention, and various aspects pertaining to its implementation, have been discussed above. By way of further explanation, the following list provides some examples of possible applications of the invention. It will be understood that these applications are suggested solely to assist further understanding of the invention by placing it in the context of possible applications. However, the invention is in no way limited to or by any of these particular possible applications, and indeed, a range of other applications is possible.

MIMO schemes where the computation of the lattice reduction matrix at the receiver would be a large computational burden. This is generally the case in wireless cellular systems where the mobile station has limited computational power. Other application areas might include low-cost receivers such as those used in wireless sensor networks.

Multicast transmissions, where the transmitter sends a single message to multiple receivers. In this case the transmitter can send the individual lattice reduction matrix to each of the receivers. Alternatives to lattice reduction such as precoding or beamforming cannot be used since each receiver has an individual channel, which would require an individual pre-code or beamforming weight per receiver at the transmit side.

Data repetition for erroneously received data packets. In wireless cellular systems, Hybrid Automatic Repeat Request (HARQ) mechanisms are typically used when a data packet is received erroneously. In HARQ the transmitter re-transmits the erroneously received data packet, thereby consuming valuable resources. With the scheme proposed by the present invention, instead of re-transmitting the erroneously received data packet, the transmitter could send the lattice reduction matrix to the receiver. The receiver could subsequently attempt a re-decode the data packet using the lattice reduction matrix. The benefit of this comes from the fact that only the lattice reduction matrix needs to be signalled from the transmitter to the receiver instead of re-sending the entire data packet.

In any of the aspects or embodiments of the invention described above, the various features may be implemented in hardware, or as software modules running on one or more processors. In particular, aspects of the invention may be implemented as software which, when executed by a processor of a transmitter, causes the transmitter to implement any of the methods described above. Similarly, aspects of the invention may be implemented as software which, when executed by a process of a transmitter, provides a transmitter in accordance with the invention as described above. Features of one aspect may be applied to any of the other aspects.

The invention also provides a computer program or a computer program product for carrying out any of the methods described herein, and a computer readable medium having stored thereon a program for carrying out any of the methods described herein.

A computer program embodying the invention may be stored on a computer-readable medium, or it could, for example, be in the form of a signal such as a downloadable data signal provided from an Internet website, or it could be in any other form.

Those skilled in the art will recognise that various changes and alterations may be made to the various aspects and embodiments of the invention described herein without departing from the spirit and scope of the invention.

The invention claimed is:

1. A wireless communication system comprising:
a transmitter operable to transmit a source signal, the transmitter having one or more transmitting antennae, wherein the source signal is multiplied by a channel matrix before being transmitted by the transmitter; and
a receiver operable to receive a received signal, the receiver having one or more receiving antennae;
wherein the transmitter comprises a calculating unit for calculating a lattice reduction matrix for transforming the channel matrix into a form in which rows and columns are more orthogonal, the transmitter being operable to obtain a decomposed representation of the lattice reduction matrix and to transmit said decomposed representation of the lattice reduction matrix to the receiver, wherein the decomposed representation of the lattice matrix is represented by fewer bits than the lattice reduction matrix, and
wherein the receiver is further operable to receive the decomposed representation of the lattice reduction matrix, to reconstruct the lattice reduction matrix therefrom, and to obtain an estimate of the source signal utilizing the lattice reduction matrix.

2. The wireless communication system according to claim 1, wherein the transmitter is a transmitter of a base station, the receiver is a receiver of a user station, the lattice reduction matrix is calculated at the base station and the decomposed representation of the lattice reduction matrix is transmitted from the base station to the user station.

3. The wireless communication system according to claim 1, wherein an identifying index is assigned to each totally unimodular matrix in a set of totally unimodular matrices, and in transmitting the decomposed representation of the lattice reduction matrix, which comprises one or more of the totally unimodular matrices in the set, indices for one or more relevant totally unimodular matrices, the product of which is the lattice reduction matrix, are transmitted instead of transmitting the one or more relevant totally unimodular matrices themselves or elements thereof.

4. A transmitter for use in a wireless communication system, the transmitter comprising:
one or more transmitting antennae operable to transmit a source signal to a receiver which has one or more receiving antennae operable to receive a received signal, wherein the source signal is multiplied by a channel matrix before being transmitted by the transmitter;
a calculating unit for calculating a lattice reduction matrix for transforming the channel matrix into a form in which rows and columns are more orthogonal; and
wherein the transmitter is further operable to obtain a decomposed representation of the lattice reduction matrix and to transmit said decomposed representation to the receiver, wherein the decomposed representation of the lattice reduction matrix is represented by fewer bits than the lattice reduction matrix.

5. The transmitter according to claim 4, wherein the transmitter is a transmitter of a base station, the receiver is a receiver of a user station, the lattice reduction matrix is calculated at the base station and the decomposed representation of the lattice reduction matrix is transmitted from the base station to the user station.

6. The transmitter according to claim 4, wherein the lattice reduction matrix is a unimodular matrix and the decomposed representation thereof comprises one or more totally unimodular matrices the product of which is the lattice reduction matrix, the one or more totally unimodular matrices being taken from a set of totally unimodular matrices, wherein the one or more totally unimodular matrices are determined by initially defining that a current intermediate matrix equals the lattice reduction matrix and then iteratively repeating the following until obtaining a calculated matrix, or the calculated matrix when pre- or post-multiplied by one of the totally unimodular matrices in the set, equals (or equals a scalar multiple of) one of the totally unimodular matrices in the set:

for each of the totally unimodular matrices in the set which perform column and row additions:

calculating an intermediate matrix by post-multiplying the current intermediate matrix by a totally unimodular matrix;

calculating a norm of the intermediate matrix and if the norm is a smallest norm calculated so far, remembering the norm as the smallest norm calculated so far, storing the totally unimodular matrix as a current totally unimodular matrix, and redefining the intermediate matrix as the intermediate matrix for the next iteration;

calculating the intermediate matrix by pre-multiplying the current intermediate matrix by the totally unimodular matrix; and calculating the norm of the intermediate matrix and if the norm is the smallest norm calculated so far, remembering the norm as the smallest norm calculated so far, storing the totally unimodular matrix as the current totally unimodular matrix, and redefining the intermediate matrix as the intermediate matrix for the next iteration.

7. The transmitter according to claim 6, wherein matrix inversion is performed if necessary in order to obtain the one or more totally unimodular matrices the product of which is the lattice reduction matrix.

8. The transmitter according to claim 4, wherein, if there is an error in, or a problem associated with, a data packet received by the receiver, the transmitter is adapted to transmit the decomposed representation of the lattice reduction matrix to the receiver thereby enabling the receiver to re-decode the data packet using the lattice reduction matrix, instead of re-transmitting the data packet.

9. The transmitter according to claim 4, wherein the lattice reduction matrix is a unimodular matrix and the decomposed representation thereof comprises one or more totally unimodular matrices the product of which is the lattice reduction matrix.

10. The transmitter according to claim 9, wherein an identifying index is assigned to each totally unimodular matrix in a set of totally unimodular matrices, and in transmitting the decomposed representation of the lattice reduction matrix, which comprises one or more of the totally unimodular matrices in the set, indices for one or more relevant totally unimodular matrices, the product of which is the lattice reduction matrix, are transmitted instead of transmitting the one or more relevant totally unimodular matrices themselves or elements thereof.

11. The transmitter according to claim 10, wherein if a totally unimodular matrix is multiplied by itself one or more times in the decomposed representation of the lattice reduction matrix, a power m is transmitted (where m-1 is the number of times that the totally unimodular matrix is multiplied by itself) instead of transmitting the index for the totally unimodular matrix a required number of times.

12. A method for use in a wireless communication system which incorporates a transmitter for transmitting a source signal using one or more transmitting antennae and a receiver for receiving a received signal using one or more receiving antennae, the method comprising, at the transmitter:

transmitting the source signal from the transmitter to the receiver, wherein the source signal is multiplied by a channel matrix before being transmitted by the transmitter;

calculating a lattice reduction matrix for transforming the channel matrix into a form in which rows and columns are more orthogonal; and finding a decomposed representation of the lattice reduction matrix, wherein the decomposed representation of the lattice reduction matrix is represented by fewer bits than the lattice reduction matrix;

transmitting the decomposed representation of the lattice reduction matrix to the receiver, the method further comprising, at the receiver:

receiving the decomposed representation from the transmitter; and reconstructing the lattice reduction matrix and using it to obtain an estimate of the source signal based on the received signal.

13. The method according to claim 12, further comprising feeding back channel state information (CSI) from the receiver to the transmitter, wherein the channel state information is used in calculating the lattice reduction matrix at the transmitter.

14. The method according to claim 12, wherein, in the wireless communication system, the transmitter is a transmitter of a base station and the receiver is a receiver of a user station, the finding of the decomposed representation of the lattice reduction matrix comprising finding one or more totally unimodular matrices the product of which is the lattice reduction matrix.

15. The method according to claim 14, wherein an identifying index is assigned to each totally unimodular matrix in a set of totally unimodular matrices, and transmitting the decomposed representation of the lattice reduction matrix, which comprises one or more of the totally unimodular matrices in the set, involves transmitting the indices for relevant totally unimodular matrices.

16. The method according to claim 15, wherein if a totally unimodular matrix is multiplied by itself one or more times in the decomposed representation of the lattice reduction matrix, then transmitting the decomposed representation of the lattice reduction matrix involves transmitting a power m (where m-1 is the number of times that the totally unimodular matrix is multiplied by itself) instead of transmitting the index for the totally unimodular matrix a required number of times.

* * * * *